United States Patent [19]

Rutledge

[11] 3,860,667

[45] Jan. 14, 1975

[54] METHOD OF PREPARING 1-METHYL-3-PHENYL-INDANE

[75] Inventor: Thomas F. Rutledge, Wilmington, Del.

[73] Assignee: ICI United States Inc., Wilmington, Del.

[22] Filed: Jan. 3, 1974

[21] Appl. No.: 430,550

[52] U.S. Cl. .......................... 260/668 F, 260/669 P
[51] Int. Cl. ............................................. C07c 15/06
[58] Field of Search ..................... 260/668 F, 669 P

[56] References Cited

UNITED STATES PATENTS 3,691,244   9/1972   Koehler et al. .................. 260/668 F

*Primary Examiner*—C. Davis

[57] ABSTRACT

An improved method of preparing 1-methyl-3-phenyl-indane directly from styrene is disclosed. The method involves dimerizing styrene in the presence of dilute sulfuric acid and an alcohol selected from the group consisting of ethanol and isopropanol.

6 Claims, No Drawings

METHOD OF PREPARING 1-METHYL-3-PHENYL-INDANE

BACKGROUND OF THE INVENTION

1. Field of the Invention

The present invention relates generally to an improved method of preparing 1-methyl-3-phenyl-indane, sometimes referred to hereinafter simply as methyl phenyl indane, from styrene. More particularly, the method involves dimerizing styrene by heating in the presence of dilute sulfuric acid and an alcohol selected from the group consisting of ethanol and isopropanol.

2. Description of the Prior Art

The preparation of dimers of styrene is well known in the art. A preferred process is to catalyze the dimerization of styrene by means of aqueous sulfuric acid so as to convert the styrene, at a yield of approximately 95 to 100 percent, to a product the major proportion of which is dimer and a minor proportion of which is a polymeric derivative consisting mainly of trimer.

The dimer obtained generally consists of a mixture of a linear material having the following formula:

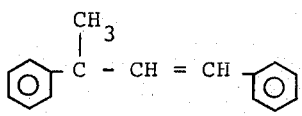

and a cyclic product, identified as 1-methyl-3-phenyl-indane, having the following formula.

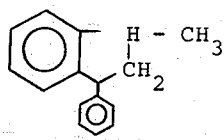

Generally, 1-methyl-3-phenyl-indane is prepared from styrene by a two step procedure wherein the styrene is first converted to the linear dimer in a dilute sulfuric acid solution and the linear dimer is subsequently cyclized by heating in a concentrated sulfuric acid solution. See, in this regard, the discussion in Rosen, "Studies on the Dimerization of Styrene in Aqueous Sulfuric Acid," 18 J. Org. Chem., 1701 (1953). It is also known as discussed in the previously mentioned Rosen article, that the cyclic dimer can be prepared directly from styrene by refluxing the styrene in a concentrated aqueous solution of sulfuric acid.

The effect of solvents, such as benzene, heptane, and ethyl benzene on the dimerization of styrene is discussed in an article by Corson et al. entitled "Dimerization of Styrene in the Presence and Absence of Solvent," 19 J. Org. Chem. 17 (1954). All of the data given in this reference are based on runs in what is referred to herein as a concentrated aqueous solution (71 percent by weight) of sulfuric acid. From the data presented it does not appear that any of the solvents are useful in increasing the overall yield of methyl-phenyl-indane.

In accordance with the present invention, methyl-phenyl-indane is prepared directly from styrene under relatively mild conditions by dimerizing styrene in a mixture of dilute sulfuric acid and an alcohol selected from the group consisting of ethanol and isopropanol.

SUMMARY OF THE INVENTION

As mentioned above, the present invention relates to an improved method of preparing methyl-phenyl-indane directly from styrene, said method comprising dimerizing styrene in a mixture of dilute sulfuric acid and an alcohol which may be either ethanol or isopropanol.

DESCRIPTION OF THE PREFERRED EMBODIMENTS

A significant advantage of the process of the present invention is the ability to prepare methyl-phenyl-indane directly from styrene using dilute sulfuric acid and under relatively mild conditions. This is a distinct advantage over the prior art methods which required the use of both concentrated solutions of sulfuric acid and elevated temperatures, generally on the order of reflux temperature of the reaction medium. As will be readily apparent to those skilled in the art, another significant advantage of the present invention is the ability to prepare methyl-phenyl-indane in a relatively high yield in a one step process.

These results are achieved, in accordance with the present invention, by carrying out the dimerization reaction of styrene in the presence of dilute sulfuric acid and an alcohol selected from the group consisting of ethanol and isopropanol. As used herein, the term dilute sulfuric acid refers to an aqueous solution of sulfuric acid wherein the concentration of sulfuric acid is equal to from about 40 to about 55 percent by weight. As mentioned above, when concentrated solutions of sulfuric acid are employed — i.e., those containing at least about 60 percent by weight sulfuric acid, methyl-phenyl-indane may be prepared directly from styrene by refluxing the mixture of styrene and concentrated sulfuric acid. It has been found, quite unexpectedly, that the addition of one of the above mentioned alcohols to a concentrated solution of sulfuric acid does not result in the improvements noted when the alcohol is used together with a dilute solution of said acid. Thus, when concentrated solutions of sulfuric acid are employed the reaction mixture must still be heated to an elevated temperature to produce methyl-phenyl-indane as the predominant product regardless of whether one of the alcohols useful in the present invention are included in the reaction mixture or not.

As mentioned above, the process of the present invention comprises combining styrene monomer in a dilute aqueous solution of sulfuric acid and either ethanol or isopropanol and heating the resulting mixture to prepare the cyclic dimer of styrene.

In accordance with the present invention it has been found to be critical that the styrene be dissolved in a dilute solution of sulfuric acid. Other acids, such as phosphoric acid which are conventionally employed in the dimerization of styrene may not be utilized in the improved process of the present invention. As was also mentioned above, the reaction is carried out in a dilute aqueous solution of sulfuric acid wherein the amount of acid is equal to from about 40 percent to about 55 percent by weight. Although concentrations of acid below about 40 percent by weight may also be utilized, such acids are not preferred since they generally result in longer reaction times resulting in an uneconomic system. However, as mentioned above, it has been found that the improved results of the process of the present invention are not achieved if there is employed a concentrated solution of sulfuric acid — i.e., one containing more than about 60 percent by weight sulfuric acid. Especially preferred results are achieved in accordance with the present invention when the reaction is run in dilute sulfuric acid containing from about 45 percent by weight to about 53 percent by weight acid.

The amount of dilute sulfuric acid employed has not been found to be narrowly critical to the process of the present invention. However, it is preferred that there be employed at least one milliliter of acid for each milliliter of styrene utilized. Additional acid may be utilized. However, it has been found that no practical advantage is achieved by employing more than about 5 ml of acid per ml of styrene and it is therefore not preferred to utilize more than this amount of acid.

As mentioned above, the alcohols which may be employed in the present invention include ethanol and isopropanol. Mixtures of the above mentioned alcohols may also be utilized. The amount of alcohol employed should be equal to at least about 1 ml per 10 mls of dilute sulfuric acid. Additional amounts of alcohol may be utilized in accordance with the present invention. However, preferred results are achieved when there is employed from about 1 milliliter to about 4 milliliters of alcohol per 10 milliliters of dilute sulfuric acid. Specially preferred results are achieved when there are employed about 2 milliliters of alcohol for each 10 milliliters of dilute acid.

As mentioned above, an advantage of the process of the present invention is the ability to carry out the dimerization of styrene under relatively mild reaction conditions. Thus, it has been found that, when working with the system of the present invention, the dimerization may be carried out at temperatures significantly lower than those required with concentrated sulfuric acid solutions. In accordance with the present invention, preferred results are achieved at reaction temperatures of from about 50°C. to about 85°C. Although lower temperatures may also be employed, these temperatures generally require reaction times which are longer than would be desirable for most operations. Similarly, at temperatures above about 85°C., refluxing of the reaction mixture would be required. This is also undesirable from a commercial viewpoint.

In accordance with the present invention, the heating is continued until substantially all of the styrene has reacted. In the preferred systems of the present invention this is usually accomplished within about 2 – 4 hours although longer heating times may be utilized if desired.

After the reaction is completed, the dimer fraction is separated from the higher boiling (polymeric) fraction by flash distillation. Any linear dimer formed is then separated from the methyl-phenyl-indane by distillation since the difference in boiling points between the two materials is approximately 13°C.

The methyl-phenyl-indane prepared in accordance with the present invention is a valuable intermediate in the preparation of a variety of organic compounds. The methyl-phenyl-indane may be oxidized with chromic acid to prepare ortho-benzoylbenzoic acid which is subsequently converted to anthraquinone a starting material for the production of various dye stuffs. Thus, the process of the present invention provides a convenient method of preparing anthraquinone from styrene which is a relatively cheap raw material. Similarly, the methyl-phenyl-indane may be oxidized to ortho-benzoylbenzoic acid by the use of nitric acid or a chromium compound as described in U.S. Pat. No. 3,658,893 issued to Sturm et al.

In order to describe the present invention so that it may be more clearly understood, the following examples are set forth. These examples are set forth primarily for the purpose of illustration and any enumeration of detail contained therein should not be interpreted as a limitation on the concept of the present invention.

EXAMPLE 1

Into a 1 liter reaction flask equipped with a stirrer, thermometer, and means for heating the reaction mixture, there were added 490 ml of a 40 percent by weight aqueous sulfuric acid,
100 ml of isopropanol, and
104 grams (1.0 mol) of styrene.

The resulting reaction mixture was stirred and heated to 70°C. and maintained at that temperature for 13¼ hours. At the end of this time, the organic layer was separated in a separatory funnel, weighed, and stirred with anhydrous sodium carbonate to neutralize any residual acid. The sodium carbonate was filtered off and the solution was analyzed by gas-liquid chromatography. Analysis of the resulting material indicated 13.8 percent methyl-phenyl-indane, 2.5 percent of the unsaturated linear dimer, and 19 percent of the polymeric trimer.

By comparison, a reaction conducted as described above but without the addition of isopropanol to the reaction mixture, after heating at 70°C. for 12⅓ hours contained no methyl-phenyl-indane, 5.5 percent of the unsaturated linear dimer, and 59.7 percent of the polymeric trimer.

EXAMPLE 2

Into the reaction flask described in Example 1, there were added 490 ml of a 45 percent by weight aqueous solution of sulfuric acid,
104 grams (1 mol) of styrene, and
100 ml of ethanol.

The resulting reaction mixture was heated to 70°C. and maintained at that temperature for 15½ hours. At the end of this time, the organic layer was separated as described in Example 1. Analysis of the product indicated 58.2 percent methyl-phenyl-indane, 4.5 percent of the unsaturated linear dimer, and 5.8 percent polymeric material.

By comparison, a second experiment conducted in the same manner as described above but which did not contain ethanol, after heating at 70°C. for 16¼ hours, contained 1.6 percent methyl-phenyl-indane, 32 percent of the unsaturated linear dimer, and 60 percent of the polymeric material.

EXAMPLE 3

Into the reaction flask described in Example 1, there were added 490 ml of a 45 percent by weight aqueous sulfuric acid,
104 grams (1 mol) of styrene, and
100 ml of ethanol.

The resulting reaction mixture was heated and maintained at a temperature at from 80°C. to 85°C. for 9¾ hours. At the end of this time, the organic layer was separated, and a residual acid removed by treatment with sodium carbonate and the product analyzed. Analysis indicated 70.3 percent methyl-phenyl-indane, 14 percent of the unsaturated linear dimer, and no polymeric material.

EXAMPLE 4

Into the reaction flask described in Example 1, there were added
 490 ml of a 53 percent by weight aqueous solution of sulfuric acid,
 100 ml of ethanol, and
 104 grams (1 mol) of styrene.

The resulting reaction mixture was heated to 50°C. and maintained at that temperature for 18 hours. At the end of this time, the organic layer was separated, neutralized with sodium carbonate, and the composition of the product determined by gasliquid chromatography. The results indicated that the product contained 80 percent methyl-phenyl-indane, 4.5 percent of the unsaturated linear dimer, and 3.8 percent of the polymeric material. By comparison, a control run as described above but which did not contain any ethanol, after heating at 50°C. for 12⅓ hours resulted in a product containing 3.4 percent methyl-phenyl-indane, 60 percent of the unsaturated linear dimer, and 18.6 percent of the polymeric material.

EXAMPLE 5

Into the reaction flask described in Example 1, there were added
 490 ml of a 53 percent by weight aqueous solution of sulfuric acid,
 104 grams (1 mol) of styrene, and
 varying amounts of ethanol as indicated in the following table.

The resulting reaction mixture was heated to 70°C. and maintained at that temperature for the periods of time also indicated in the following table. At the end of the heating period, the product was separated from the reaction mixture as described in Example 1 and analyzed by gas-liquid chromatography. The results of this analysis are also given in the table.

TABLE I

| Ethanol | Reaction Time | Product Composition | | |
|---|---|---|---|---|
| | | MPI[1] | U.D.[2] | Polymer |
| (ml) | (hours) | (%) | (%) | (%) |
| — | 12 | 7.5 | 73.8 | 0 |
| 100 | 2 ¾ | 73.4 | 10.9 | 4.7 |
| 150 | 3 ½ | 74.6 | 8.2 | 3 |
| 200 | 8 | 82 | 9.2 | 0 |

[1] MPI refers to 1-methyl-3-phenyl-indane.
[2] U.D. refers to the unsaturated linear dimer.

EXAMPLE 6

Into the reaction flask described in Example 1, there were added
 490 ml of a 53 percent by weight aqueous solution of sulfuric acid,
 200 ml of ethanol, and
 104 grams (1 mol) of styrene.

The resulting reaction mixture was heated to 80°C. and maintained at that temperature for 4 hours. At the end of this time, the organic layer was separated, treated with sodium carbonate and the product composition analyzed by gas-liquid chromatography. The results indicated that the product contained 61 percent methyl-phenyl-indane, 22.1 percent of the unsaturated linear dimer, and no polymeric material.

EXAMPLE 7

Into the reaction flask described in Example 1, there were added
 490 ml of a 53 percent by weight aqueous solution of sulfuric acid,
 150 ml of ethanol, and
 208 grams (2 mols) of styrene.

The resulting reaction mixture was heated to 70°C. and maintained at that temperature for 6½ hours. At the end of this time, the organic layer was separated, neutralized with sodium carbonate, and the product composition determined by gas-liquid chromatography. The results indicated the following product composition: 62 percent methyl-phenyl-indane, 3.7 percent unsaturated linear dimer, and no polymeric material.

By comparison, a second run which was identical with that described above except that the reaction mixture did not contain any ethanol, after heating at 70°C. for 13¼ hours, resulted in a product containing 7.8 percent methyl-phenyl-indane, 76.2 percent of the unsaturated linear dimer, and no polymeric material.

What is claimed is:
1. In a method of preparing 1-methyl-3-phenyl-indane from styrene by dimerizing styrene in sulfuric acid, the improvement which comprises conducting the dimerization reaction in a dilute aqueous solution of sulfuric acid and an alcohol selected from the group consisting of ethanol and isopropanol.
2. A method, as claimed in claim 1, wherein the dilute aqueous solution of sulfuric acid contains from about 40 percent to about 55 percent by weight sulfuric acid.
3. A method, as claimed in claim 1, wherein the amount of dilute acid employed is equal to from about 1 ml to about 5 mls per ml of styrene in the reaction mixture.
4. A method, as claimed in claim 1, wherein the amount of alcohol employed is equal to from about 1 to about 4 mls per 10 mls of dilute acid.
5. A method, as claimed in claim 4, wherein the amount of alcohol employed is equal to about 2 mls per 10 mls of acid.
6. A method, as claimed in claim 1, wherein the dimerization reaction is conducted at a temperature of from about 50°C. to about 85°C.

* * * * *